(12) United States Patent
Jang et al.

(10) Patent No.: US 9,404,684 B2
(45) Date of Patent: Aug. 2, 2016

(54) VACUUM INSULATION PANEL AND REFRIGERATOR INCLUDING THE SAME

(71) Applicant: SAMSUNG ELECTRONICS CO., LTD., Suwon-si, Gyeonggi-do (KR)

(72) Inventors: Choong Hyo Jang, Daejeon (KR); Hyung Sung Kim, Yongin-si (KR); Se Won Yook, Seoul (KR); Seung Hoon Kal, Anyang-si (KR); Seung Jin Oh, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 37 days.

(21) Appl. No.: 14/471,018

(22) Filed: Aug. 28, 2014

(65) Prior Publication Data

US 2015/0159937 A1 Jun. 11, 2015

(30) Foreign Application Priority Data

Dec. 10, 2013 (KR) .................. 10-2013-0152885

(51) Int. Cl.
*F16L 59/065* (2006.01)
*F25D 23/06* (2006.01)
*B32B 15/04* (2006.01)
*B32B 15/20* (2006.01)
*B32B 17/06* (2006.01)

(52) U.S. Cl.
CPC ............ *F25D 23/065* (2013.01); *B32B 15/043* (2013.01); *B32B 15/20* (2013.01); *B32B 17/061* (2013.01); *B32B 2250/03* (2013.01); *B32B 2262/101* (2013.01); *B32B 2307/304* (2013.01); *B32B 2311/24* (2013.01); *B32B 2509/10* (2013.01); *F25D 2201/14* (2013.01); *Y10T 428/12597* (2015.01); *Y10T 428/12611* (2015.01); *Y10T 428/12764* (2015.01)

(58) Field of Classification Search
CPC .......................... Y10T 428/231; F16L 59/065
See application file for complete search history.

(56) References Cited

U.S. PATENT DOCUMENTS

| | | | |
|---|---|---|---|
| 5,091,233 A * | 2/1992 | Kirby | ........................ B32B 1/06 206/484 |
| 5,505,810 A | 4/1996 | Kirby et al. | |
| 5,518,138 A | 5/1996 | Boffito et al. | |
| 2004/0180176 A1 * | 9/2004 | Rusek, Jr. | ............... E04B 1/803 428/69 |
| 2009/0047192 A1 | 2/2009 | Kihara et al. | |
| 2009/0215610 A1 | 8/2009 | Kullberg et al. | |
| 2012/0207963 A1 | 8/2012 | Jang et al. | |

FOREIGN PATENT DOCUMENTS

| | | |
|---|---|---|
| EP | 1505359 A1 | 2/2005 |
| JP | 3856008 | 12/2006 |

(Continued)

OTHER PUBLICATIONS

Translation of JP 2011-122739.*

(Continued)

*Primary Examiner* — Alexander Thomas
(74) *Attorney, Agent, or Firm* — Staas & Halsey LLP

(57) ABSTRACT

A vacuum insulation panel includes a core material, a first sheathing material disposed outside the core material, and a second sheathing material having different thermal conductivity from the first sheathing material, the second sheathing material being coupled to the first sheathing material to form a space to receive the core material.

31 Claims, 13 Drawing Sheets

(56) References Cited

FOREIGN PATENT DOCUMENTS

| | | |
|---|---|---|
| JP | 2011-122739 | 6/2011 |
| KR | 2003-0072717 | 9/2003 |
| KR | 10-2005-0031361 | 4/2005 |
| KR | 10-2013-0042431 | 4/2013 |
| KR | 10-2013-0062133 | 6/2013 |

OTHER PUBLICATIONS

Machine translation of JP 2011-122739 retrieved Nov. 2015.*
KIPRIS, Abstract of Publication No. 1020030072717, published Sep. 19, 2003.
KIPRIS, Abstract of Publication No. 1020050031361, published Apr. 6, 2005.
KIPRIS, Abstract of Publication No. 1020130062133, published Jun. 12, 2013.
Espacenet English Abstract of Japanese Publication No. 3856008, Published Dec. 13, 2006.
Patent Abstracts of Japan, Publication No. 2011-122739, Published Jun. 23, 2011.
Espacenet English Abstract of Korean Publication No. 10-2013-0042431, Published Apr. 26, 2013.
Extended European Search Report dated May 8, 2015 in corresponding European Patent Application No. 14188779.4.
PCT International Search Report dated Mar. 13, 2015 in corresponding International Patent Application No. PCT/KR2014/012120.

* cited by examiner

VACUUM INSULATION PANEL AND REFRIGERATOR INCLUDING THE SAME

CROSS-REFERENCE TO RELATED APPLICATIONS

This application claims the benefit of Korean Patent Application No. 10-2013-0152885, filed on Dec. 10, 2013 in the Korean Intellectual Property Office, the disclosure of which is incorporated herein by reference.

BACKGROUND

1. Field

Embodiments of the present invention relate to a vacuum insulation panel having an improved structure to improve insulativity and a refrigerator including the same.

2. Description of the Related Art

Energy is limited and global warming caused by carbon dioxide generated during the use of energy is one of the most critical problems with an energy crisis. As a result, energy regulations have been gradually strengthened in every country and an energy rating system for electric home appliances is a task to be settled by manufacturers. The energy rating system, which is provided to achieve the maximum efficiency using a small amount of energy, coincides with consumers' demand, such as high capacity and low power consumption. In particular, much research has been conducted into rendering refrigerators more efficient for the last several decades. Research for improvement in efficiency of a refrigeration cycle, a compressor, and heat exchanger has reached the limit. In recent years, therefore, research has been mainly conducted into heat loss and various attempts to improve energy efficiency by enhancing heat insulation performance of the refrigerator have been made.

A conventional insulation panel, such as polyurethane, has a thermal conductivity of about 20 mK/m·K. When this insulation panel is used, the thickness of the outer wall of the refrigerator is increased which reduces the storage capacity of the refrigerator. Consequently, it may be necessary to use a vacuum insulation panel exhibiting high heat insulation performance.

However, a heat bridge phenomenon (a phenomenon in which heat flows along the edge of the vacuum insulation panel) of the vacuum insulation panel conflicts with durability of the vacuum insulation panel. As a result, manufacturing an efficient vacuum insulation panel is limited.

SUMMARY

It is an aspect of the present invention to provide a vacuum insulation panel having an improved structure to prevent the occurrence of a heat bridge phenomenon and a refrigerator including the same.

It is another aspect of the present invention to provide a vacuum insulation panel having an improved structure to prevent the occurrence of a heat bridge phenomenon and to improve durability and a refrigerator including the same.

It is a further aspect of the present invention to provide a vacuum insulation panel having an improved structure to improve a heat insulation effect and to reduce the size thereof and a refrigerator including the same.

Additional aspects of the invention will be set forth in part in the description which follows and, in part, will be obvious from the description, or may be learned by practice of the invention.

In accordance with an aspect of the present invention, a vacuum insulation panel includes a core material, a first sheathing material disposed outside the core material, and a second sheathing material having different thermal conductivity from the first sheathing material, the second sheathing material being coupled to the first sheathing material to form a receiving space to receive the core material.

The first sheathing material and the second sheathing material may be coupled to form an extension extending outward from the receiving space.

The first sheathing material may have lower thermal conductivity than the second sheathing material, and the extension may be bent such that the second sheathing material is located between the core material and the first sheathing material.

The first sheathing material may include an aluminum deposited sheathing material, and the second sheathing material may include an aluminum foil sheathing material.

The core material may include glass fibers, and each glass fiber may have a diameter of 3 to 6 um and a length of 20 to 70 nm.

The vacuum insulation panel may further include a getter provided in the core material to adsorb at least one selected from between gas and moisture introduced into the core material, wherein the getter may include at least one selected from between a gas getter and a moisture getter.

The gas getter may include at least one selected from among Ba, Li, Al, Ti, V, Fe, Co, Zr, Pd, Mg, and Nb.

3 to 10 g of the moisture getter may be contained per unit area (0.1 m2) of the first sheathing material.

The moisture getter may include a chemical getter and a physical getter, the chemical getter may include at least one selected from among CaO, BaO, MgO, and CaCl2, and the physical getter may include at least one selected from among molecular sieve, active carbon, zeolite, active alumina, and MgCO3.

The chemical getter may have a specific surface area of 10 m2/g or more, and the physical getter may have a specific surface area of 50 m2/g or more.

The getter may include a catalyst to improve activity of the getter, and the catalyst may include at least one selected from among CeO2, CuO, Co3O4, PdO, and SeO2.

The first sheathing material may include a fusion layer and a blocking layer stacked outside the fusion layer, and the blocking layer may include a base layer and a deposition layer provided on the base layer to block gas and moisture introduced toward the core material.

The blocking layer may include a plurality of blocking layers, and the blocking layers may be stacked such that the base layer and the deposition layer located on the base layer are opposite to each other.

A first blocking layer, of the blocking layers, facing the fusion layer may include a first base layer to surround the fusion layer and a first deposition layer located outside the first base layer.

A second blocking layer, of the blocking layers, facing the first blocking layer may include a second deposition layer facing the first deposition layer and a second base layer located outside the second deposition layer.

The deposition layer may have a thickness of 10 to 100 nm.

The second sheathing material may include a sealing layer to surround the core material, an inner layer provided outside the sealing layer, a prevention layer located between the sealing layer and the inner layer, and a protection layer disposed outside the inner layer to absorb external impact.

In accordance with another aspect of the present invention, a refrigerator includes an outer liner forming an external appearance thereof, inner liner provided in the outer liner to form a storage compartment, and a vacuum insulation panel located between the outer liner and the inner liner, wherein the vacuum insulation panel includes a core material including glass fibers, a getter provided in the core material to adsorb at least one selected from between gas and moisture introduced into the core material, a first sheathing material disposed outside the core material so as to face an inner surface of the outer liner, and a second sheathing material having higher thermal conductivity than the first sheathing material, the second sheathing material being coupled to the first sheathing material so as to face an outer surface of the inner liner to form a receiving space to receive the core material.

The first sheathing material and the second sheathing material may be coupled to form an extension extending outward from the receiving space, and the extension may be bent toward the inner liner such that the second sheathing material is located between the core material and the first sheathing material.

Each glass fiber may have a diameter of 3 to 6 um and a length of 20 to 70 nm.

The getter may include a gas getter and a moisture getter, the gas getter may include at least one selected from among Ba, Li, Al, Ti, V, Fe, Co, Zr, Pd, Mg, and Nb, and the moisture getter may include a chemical getter including at least one selected from among CaO, BaO, MgO, and CaCl2, and a physical getter including at least one selected from among molecular sieve, active carbon, zeolite, active alumina, and MgCO3.

The getter may include a catalyst to improve activity of the getter, and the catalyst may include at least one selected from among CeO2, CuO, Co3O4, PdO, and SeO2.

The first sheathing material may include an aluminum deposited sheathing material, the first sheathing material may include a fusion layer to surround the core material and a blocking layer stacked outside the fusion layer, and the blocking layer may include a base layer and a deposition layer provided on the base layer to block gas and moisture introduced toward the core material.

The deposition layer may have a thickness of 10 to 100 nm.

The deposition layer may be formed by physical deposition including evaporation, sputtering, and aerosol deposition or chemical deposition including chemical vapor deposition (CVD).

The first sheathing material may be coupled to the inner surface of the outer liner.

In accordance with another aspect of the present invention, a vacuum insulation panel includes a core material including glass fibers, a getter provided in the core material to adsorb gas and moisture introduced into the core material such that a vacuum state of the core material is maintained, an aluminum deposited sheathing material disposed outside the core material, and an aluminum foil sheathing material coupled to the aluminum deposited sheathing material to form a receiving space to receive the core material, wherein the aluminum deposited sheathing material and the aluminum foil sheathing material are coupled to form an extension extending outward from the receiving space.

The extension may be bent such that the aluminum deposited sheathing material having low thermal conductivity is located outside the aluminum foil sheathing material.

The aluminum deposited sheathing material may include a fusion layer facing the core material and a blocking layer stacked outside the fusion layer.

The aluminum foil sheathing material may include a sealing layer to surround the core material, an inner layer provided outside the sealing layer, a prevention layer located between the sealing layer and the inner layer, and a protection layer disposed outside the inner layer to absorb external impact.

The fusion layer and the sealing layer may be in contact with each other at the extension.

In accordance with a further aspect of the present invention, a vacuum insulation panel includes a core material, a getter provided in the core material to adsorb gas and moisture introduced into the core material, a first sheathing material disposed outside the core material, and a second sheathing material having a different stack structure from the first sheathing material, the second sheathing material being coupled to the first sheathing material to form a receiving space to receive the core material.

Pores of about 30-80 um are formed between the glass fibers.

The first sheathing material is made from a material that is different than the second sheathing material.

A thickness of the first sheathing material is different that a thickness of the second sheathing material.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Now, preferred embodiments of the present invention will be described in detail with reference to the annexed drawings.

Terms "upper part," "lower part," "upper end," and "lower end" are defined based on the drawings and do not limit shapes and positions of components.

Figure 1:
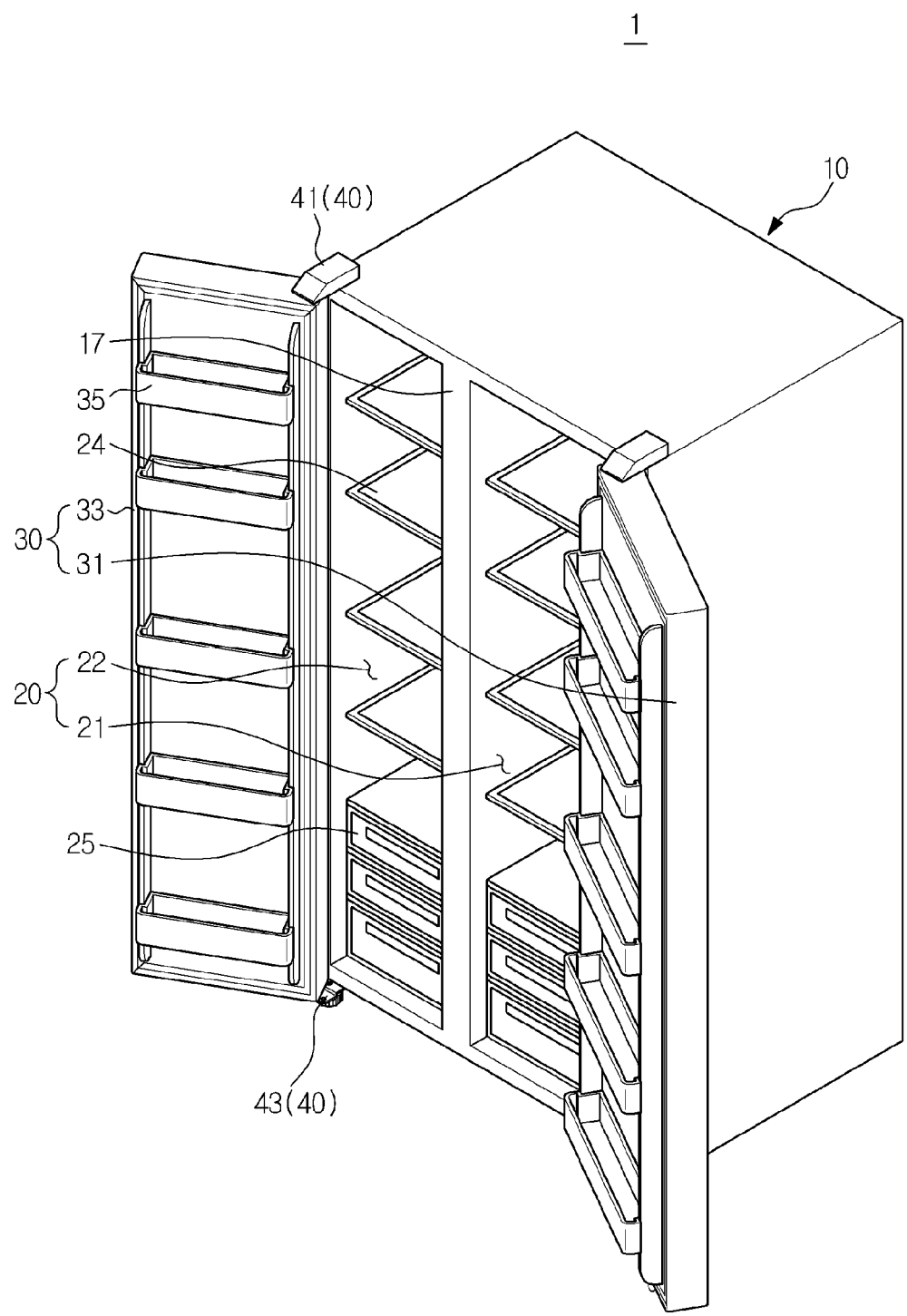
FIG. 1 is a perspective view showing an external appearance of a refrigerator according to an embodiment of the present invention.
Figure 2:
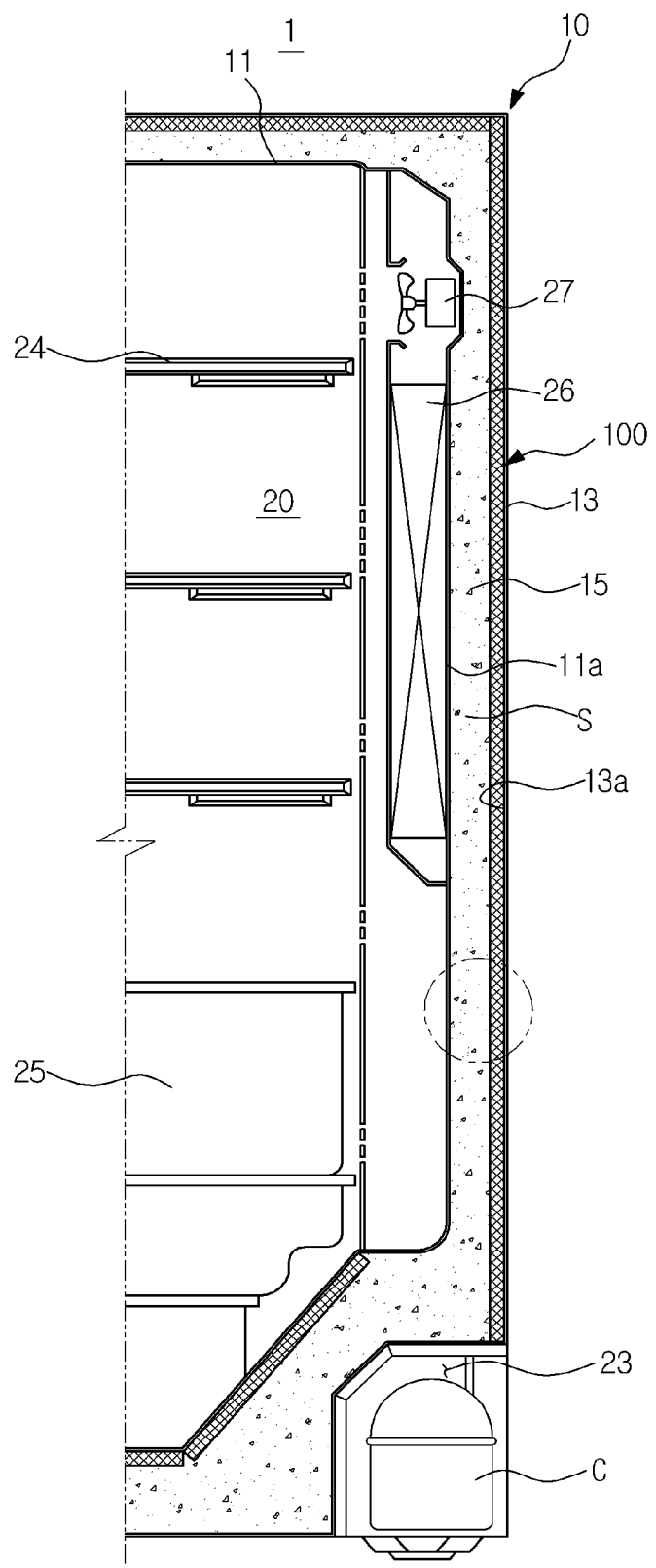
FIG. 2 is a sectional view showing the refrigerator according to an embodiment of the present invention.
Figure 3:
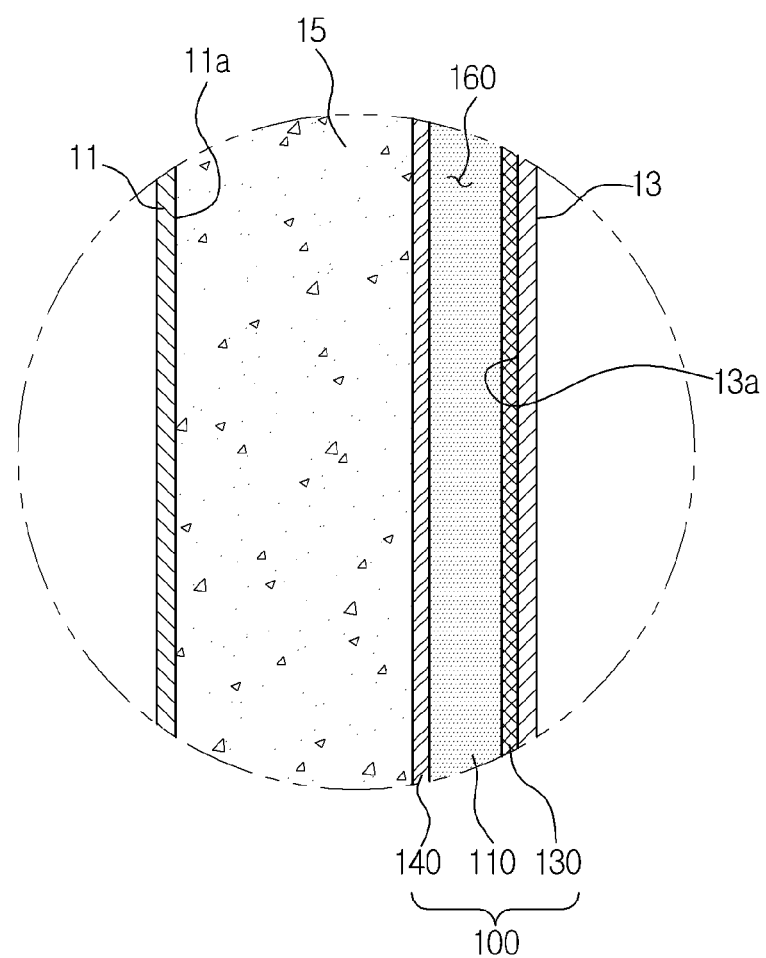
FIG. 3 is a partially enlarged sectional view of FIG. 2.
Figure 4:
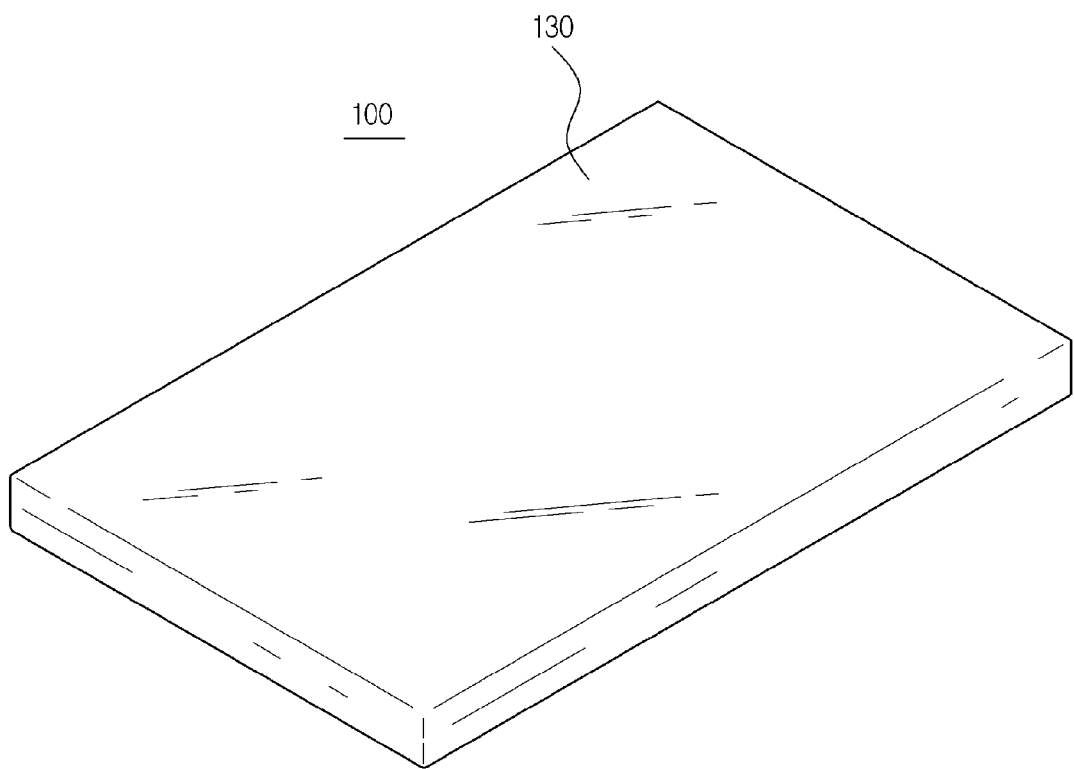
FIG. 4 is a perspective view showing a vacuum insulation panel according to an embodiment of the present invention.

FIG. 1 is a perspective view showing the external appearance of a refrigerator according to an embodiment of the present invention, FIG. 2 is a sectional view showing the refrigerator according to an embodiment of the present invention, FIG. 3 is a partially enlarged sectional view of FIG. 2, and FIG. 4 is a perspective view showing a vacuum insulation panel according to an embodiment of the present invention.

As shown in FIGS. 1 to 4, the refrigerator 1 may include a main body 10 forming the external appearance thereof and a storage compartment 20 provided in the main body 10 with the front being open.

The main body 10 includes an inner liner 11 forming the storage compartment 20 and an outer liner 13 forming the external appearance thereof. In addition, the main body 10 further includes a cool air supply device to supply cool air to the storage compartment 20.

The cool air supply device may include a compressor C, a condenser (not shown), an expansion valve (not shown), an evaporator 26, and a blowing fan 27. Between the inner liner 11 and the outer liner 13 of the main body 10 is interposed a foamed insulation panel 15 to prevent leakage of cool air from the storage compartment 20.

At the rear lower side of the main body 10 is provided a machinery compartment 23, in which the compressor C to compress refrigerant and the condenser to condense the compressed refrigerant are installed.

The storage compartment 20 is partitioned into left and right sides by a partition 17. A refrigerating compartment 21 is provided at one area of the main body 10 and a freezing compartment 22 is provided at another area of the main body 10.

The refrigerator 10 may further include a door 30 to open and close the storage compartment 20.

The refrigerating compartment 21 and the freezing compartment 22 are opened and closed by a refrigerating compartment door 31 and a freezing compartment door 33 hinged to the main body 10, respectively. A plurality of bins 35, in which foods are received, is provided at the rears of the refrigerating compartment door 31 and the freezing compartment door 33.

A plurality of shelves 24 is provided in the storage compartment 20 to partition the storage compartment 20 into a plurality of spaces. Foods are loaded on each shelf 24.

In addition, a plurality of storage boxes 25 is provided in the storage compartment 20 such that the storage boxes 25 may be inserted into or removed from the storage compartment 20 in a sliding fashion.

The refrigerator 1 may further include a hinge module 40 including an upper hinge 41 and a lower hinge 43, by which the door 30 is hinged to the main body 10.

A foam space S is provided between the inner liner 11 forming the storage compartment 20 and the outer liner 13 coupled to the outside of the inner liner 11 to form the external appearance of the main body 10. The foam space S is filled with the foamed insulation panel 15.

In order to improve insulativity of the foamed insulation panel 15, the foam space S may be filled with a vacuum insulation panel (VIP) 100 in addition to the foamed insulation panel 15.

The vacuum insulation panel 100 includes a core material 110 and sheathing materials 130 and 140. The sheathing materials 130 and 140 prevent gas and moisture from penetrating the vacuum insulation panel 100 to maintain the life span of the vacuum insulation panel 100.

The sheathing materials 130 and 140 of the vacuum insulation panel 100 may include a first sheathing material 130 and a second sheathing material 140.

The first sheathing material 130 and the second sheathing material 140 have different thermal conductivities. Specifically, the first sheathing material 130 having low thermal conductivity may be disposed outside the core material 110 so as to face an inner surface 13a of the outer liner 13. The second sheathing material 140 having high thermal conductivity may be disposed outside the core material 110 so as to face an outer surface 11a of the inner liner 11 or may be coupled to the first sheathing material 130 to define a receiving space (not shown) to receive the core material 110.

The first sheathing material 130 may be in tight contact with inner surface 13a of the outer liner 13. Since the first sheathing material 130 having low thermal conductivity is in tight contact with the inner surface 13a of the outer liner 13, heat insulation performance may be improved and external moisture and gas may be prevented from being introduced into the vacuum insulation panel 100. In addition, since the outer surface of the first sheathing material 130 facing the inner surface 13a of the outer liner 13 is flat, the outer surface of the first sheathing material 130 may easily come into tight contact with the inner surface 13a of the outer liner 13. Since an extension 150 (see FIG. 5), formed by the first sheathing material 130 and the second sheathing material 140 when being coupled, is bent toward the inner liner 11 such that the first sheathing material 130 having low thermal conductivity is located outside the second sheathing material 140, the outer surface of the second sheathing material 140 may not be flat.

However, the first sheathing material 130 is not limited to being in tight contact with the inner surface 13a of the outer liner 13. Instead of the first sheathing material 130, the second sheathing material 140 may be in tight contact with the inner surface 13a of the outer liner 13.

Figure 5:
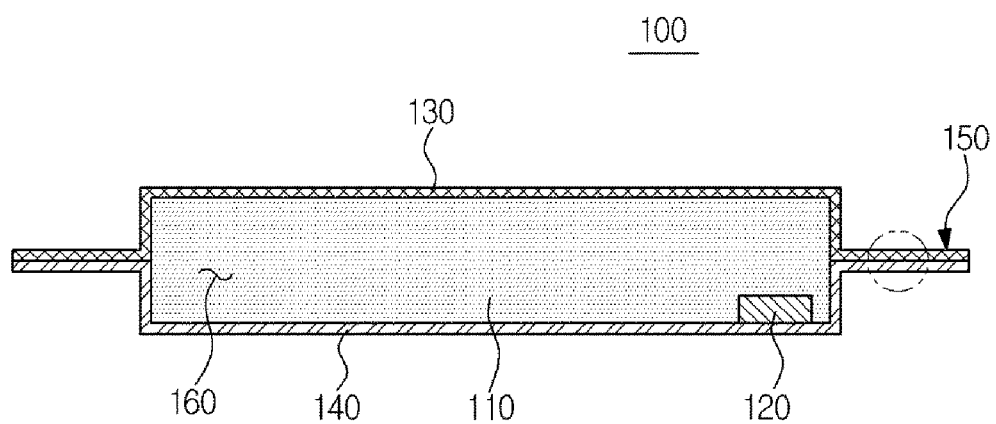
FIG. 5 is a sectional view showing a state of an extension of the vacuum insulation panel according to the embodiment of the present invention before the extension is bent.
Figure 6:
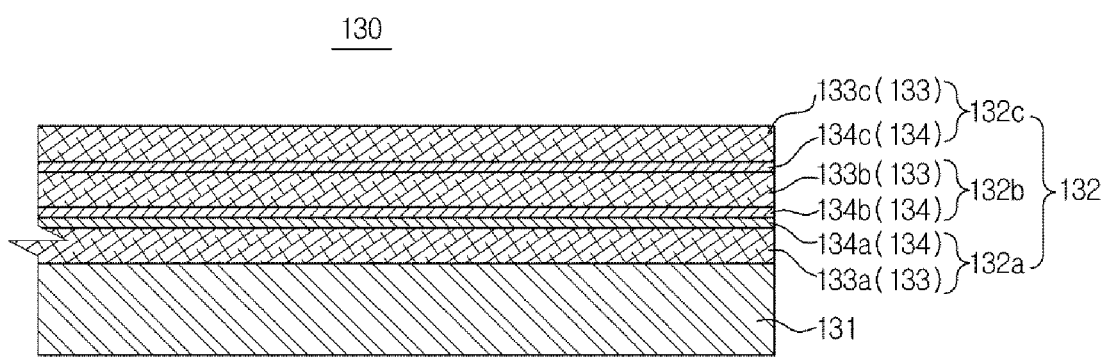
FIG. 6 is an enlarged sectional view showing a first sheathing material of the vacuum insulation panel according to an embodiment of the present invention.
Figure 7:
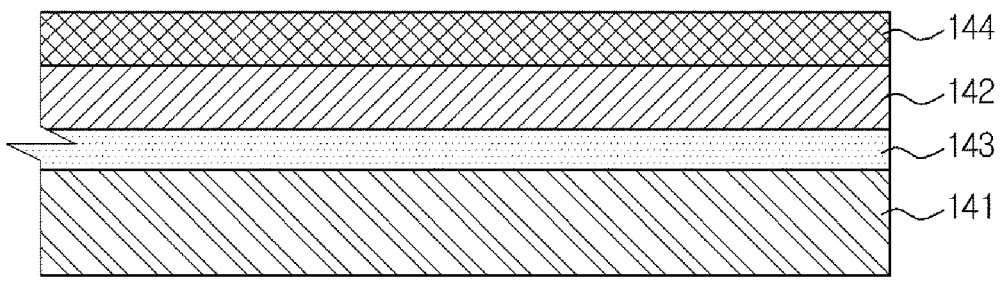
FIG. 7 is an enlarged sectional view showing a second sheathing material of the vacuum insulation panel according to an embodiment of the present invention.
Figure 8:
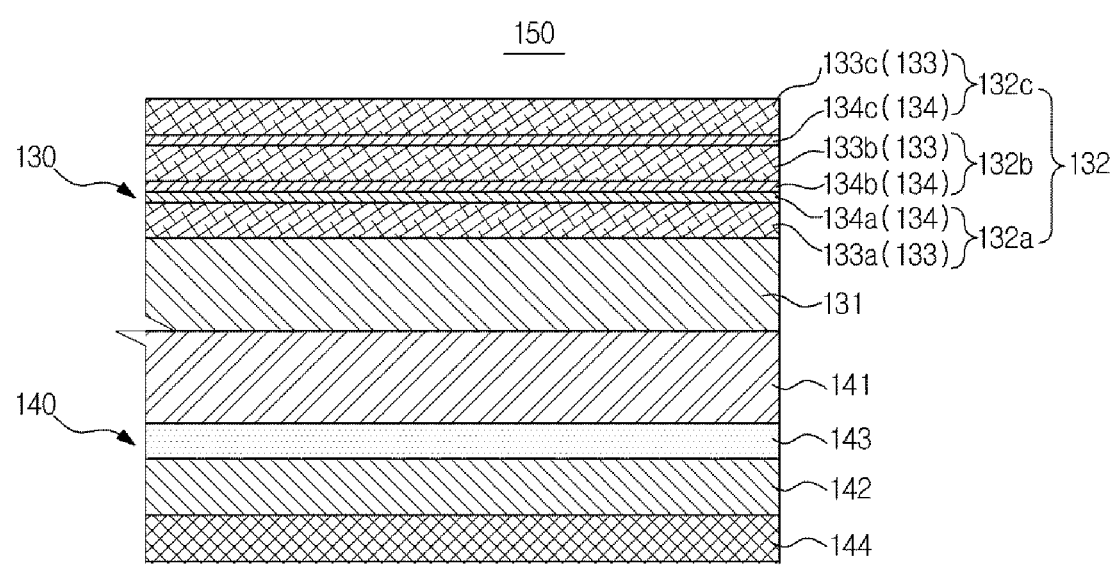
FIG. 8 is an enlarged sectional view showing the extension of the vacuum insulation panel of FIG. 5 according to an embodiment of the present invention.

FIG. 5 is a sectional view showing a state of the extension of the vacuum insulation panel according to an embodiment of the present invention before the extension is bent, FIG. 6 is an enlarged sectional view showing the first sheathing material of the vacuum insulation panel according to an embodiment of the present invention, FIG. 7 is an enlarged sectional view showing the second sheathing material of the vacuum insulation panel according to an embodiment of the present invention, FIG. 8 is an enlarged sectional view showing the extension of the vacuum insulation panel according to an embodiment of the present invention.

The first sheathing material 130 may include an aluminum deposited sheathing material and the second sheathing material 140 may include an aluminum foil sheathing material. Hereinafter, the first sheathing material 130 will be referred to as an aluminum deposited sheathing material and the second sheathing material 140 will be referred to as an aluminum foil sheathing material for the convenience of description. The aluminum foil sheathing material 140 has low moisture and gas permeability but causes a heat bridge phenomenon (a phenomenon in which heat flows along the edge of the vacuum insulation panel), whereby heat insulation performance of the aluminum foil sheathing material may be lowered. On the other hand, the aluminum deposited sheathing material 130 has a thinner aluminum layer than the aluminum foil sheathing material, thereby preventing the occurrence of the heat bridge phenomenon. However, the aluminum deposited sheathing material 130 has high moisture and gas permeability, whereby durability of the aluminum deposited sheathing material 130 is lowered.

Hereinafter, the vacuum insulation panel 100 according to the embodiment of the present invention, which prevents the occurrence of the heat bridge phenomenon while having improved durability, will be described.

In the following description, the term "top" means the surface directed outwardly of the vacuum insulation panel and "bottom" means the surface directed inwardly of the vacuum insulation panel, i.e. toward the core material of the vacuum insulation panel. For reference numerals which are not shown, see FIGS. 1 to 4.

As shown in FIGS. 5 to 8, the vacuum insulation panel 100 may include the core material 110, the first sheathing material 130, the second sheathing material 140, and a getter 120.

The core material 110 may include glass fibers having an excellent heat insulation property. When panels formed of thinner glass fibers are stacked, a higher heat insulation effect may be obtained. Specifically, when a pore between the respective glass fibers is small, radiation, which is a heat insulation property, may be minimized, thereby achieving a high heat insulation effect. Each glass fiber may have a diameter of 3 to 6 um and a length of 20 to 70 nm. In addition, the pore between the respective glass fibers may be 30 to 80 um. However, the diameter and length of each glass fiber and the pore between the respective glass fibers are not limited thereto.

The getter 120 may be provided in the core material 110 to adsorb gas and/or moisture introduced into the core material 110 such that a vacuum state of the core material 110 is maintained. The getter 120 may be powder or have a shape, such as a predetermined block or rectangular parallelepiped. In addition, the getter 120 may be coated on the inner surface of the first sheathing material 130 and/or the second sheathing material 140 or the surface of the core material 110 or inserted into the core material 110.

The getter 120 may include a gas getter and/or a moisture getter. When the getter 120 includes both the gas getter and the moisture getter, the getter 120 may include 50% or less of a gas getter and/or 50% or more of a moisture getter.

The gas getter may include a metal component. Specifically, the gas getter may include at least one selected from among Ba, Li, Al, Ti, V, Fe, Co, Zr, Pd, Mg, and Nb. 0.4 to 5 g of a gas getter may be contained per unit area ($0.1\ m^3$) of the first sheathing material 130.

The moisture getter adsorbs and removes residual moisture in the vacuum insulation panel 100 and moisture permeated into the vacuum insulation panel 100. From 3 to 10 g of a moisture getter may be contained per unit area ($0.1\ m^3$) of the first sheathing material 130. If less than 3 g of a moisture getter is used, the life span of the vacuum insulation panel 100 may be shortened. If more than 10 g of a moisture getter is used, the area occupied by the getter 120 may be increased, thereby increasing thermal conductivity and manufacturing cost.

The moisture getter may include a chemical getter including at least one selected from among CaO, BaO, MgO, and $CaCl_2$ and a physical getter including at least one selected from among molecular sieve, active carbon, zeolite, active alumina, and $MgCO_3$. The higher the specific surface area is, the higher the adsorption performance of the getter 120 is. The chemical getter may have a specific surface area of 10 $m^2/g$ or more and the physical getter may have a specific surface area of 50 $m^2/g$ or more.

The getter 120 may further include a catalyst.

The catalyst serves to convert gas introduced into the core material 110 into a state in which the gas is easily adsorbed by a metal component of the gas getter. The catalyst may include at least one selected from among $CeO_2$, CuO, $Co_3O_4$, PdO, and $SeO_2$.

The first sheathing material 130 may be disposed at one side of the core material 110 and the second sheathing material 140 may be disposed at the other side of the core material 110 such that the second sheathing material 140 is coupled to the first sheathing material 130 to define a receiving space 160 to receive the core material 110. As previously described, the first sheathing material 130 and the second sheathing material 140 may have different thermal conductivities.

The first sheathing material 130 and the second sheathing material 140 may be formed of different materials to have different thermal conductivities.

In addition, the first sheathing material 130 and the second sheathing material 140 may have different thicknesses to have different thermal conductivities.

The first sheathing material 130 and the second sheathing material 140 may have different stack structures. Specifically, the first sheathing material 130 and the second sheathing material 140 may have different layers. Although the layers constituting the first sheathing material 130 and the second sheathing material 140 are the same, the layers of the first sheathing material 130 and the second sheathing material 140 may be differently arranged.

The first sheathing material 130 and the second sheathing material 140 may be coupled to form the extension 150 extending outward from the receiving space 160. The extension 150 may extend from opposite sides of the core material 110 outward. The first sheathing material 130 and the second sheathing material 140 are in tight contact with each other at the extension 150 to maintain a vacuum state of the receiving space 160, in which the core material 110 is received.

The first sheathing material 130 may include a fusion layer 131 and a plurality of blocking layers 132.

The fusion layer 131 may be in tight contact with the surface of the core material 110. The fusion layer 131 may include at least one selected from among linear low-density polyethylene (LLDPE), low density polyethylene (LDPE), high density polyethylene (HDPE), and casting polypropylene (CPP), which have high sealability. In addition, the fusion layer 131 may be formed of a film.

The blocking layers 132 may be stacked at the top of the fusion layer 131. The blocking layers 132 may include a base layer 133 and a deposition layer 134.

The deposition layer 134 may be formed by physical deposition including evaporation, sputtering, and aerosol deposition or chemical deposition including chemical vapor deposition (CVD).

Aluminum (Al) may be deposited on the deposition layer 134. However, other metals may be deposited on the deposition layer 134. In addition, the deposition layer 134 may have a thickness of 10 to 100 nm. Hereinafter, it is assumed that the blocking layers 132 include a first blocking layer 132a, a second blocking layer 132b, and a third blocking layer 132c for the convenience of description.

The first blocking layer 132a located at the top of the fusion layer 131 so as to face the fusion layer 131 may include a first base layer 133a to surround the fusion layer 131 and a first deposition layer 134a disposed at the top of the first base layer 133a.

The second blocking layer 132b located at the top of the first blocking layer 132a so as to face the first blocking layer 132a may include a second base layer 133b disposed at the top of the first deposition layer 134a and a second deposition layer 134b located between the first deposition layer 134a and the second base layer 133b. That is, the second blocking layer 132b may be stacked at the top of the first blocking layer 132a such that the first deposition layer 134a and the second deposition layer 134b face each other.

The third blocking layer 132c located at the top of the second blocking layer 132b may include a third deposition layer 134c disposed at the top of the second base layer 133b and a third base layer 133c located at the top of the third deposition layer 134c so as to be disposed at the outermost side of the first sheathing material 130.

The second blocking layer 132b is stacked at the top of the first blocking layer 132a such that the first deposition layer 134a and the second deposition layer 134b face each other in order to prevent cracks from being generated in the first deposition layer 134a. Specifically, if the first deposition layer 134a is in tight contact with the fusion layer 131, cracks may be generated in the first deposition layer 134a due to properties of the fusion layer 131. If cracks are generated in the first deposition layer 134a, gas and moisture may be introduced into the vacuum insulation panel 100 through the cracks, thereby lowering heat insulation performance of the vacuum insulation panel 100. For this reason, the second blocking layer 132b is stacked at the top of the first blocking layer 132a such that the first deposition layer 134a and the second deposition layer 134b face each other.

The blocking layers 132 may have a structure in which the base layer 133 and the deposition layer 134 located at the top of the base layer 133 are opposite to each other.

The second sheathing material 140 may include a sealing layer 141, an inner layer 142, a prevention layer 143, and a protection layer 144.

The sealing layer 141 may be in tight contact with the surface of the core material 110 to surround the core material 110 together with the fusion layer 131 of the first sheathing material 130. The sealing layer 141 may include at least one selected from among linear low-density polyethylene (LLDPE), low density polyethylene (LDPE), high density polyethylene (HDPE), and casting polypropylene (CPP), which have high sealability. In addition, the sealing layer 141 may have a thickness of 10 to 50 μm.

The inner layer 142 may be located at the top of the sealing layer 141. The inner layer 142 may include at least one selected from among polyethylene phthalate (PET), vacuum metalized polyethylene phthalate (VMPET), ethylene vinyl alcohol (EVOH), and nylon. The inner layer 142 may have a thickness of 5 to 30 μm.

The prevention layer 143 may be provided between the sealing layer 141 and the inner layer 142. The prevention layer 143 may include aluminum (Al). The prevention layer 143 may have a thickness of 5 to 30 μm.

The protection layer 144 absorbs and disperses external impact to protect the surface of the vacuum insulation panel 100 or the core material 110 in the vacuum insulation panel 100 from the external impact. To this end, the protection layer 144 is formed of a high impact resistant material.

The protection layer 144 may be disposed at the top of the inner layer 142. That is, the protection layer 144 may be located at the outermost side of the second sheathing material 140. The protection layer 144 may include at least one selected from among polyethylene phthalate (PET), oriented polypropylene (OPP), nylon, and oriented nylon. The protection layer 144 may have a thickness of 10 to 30 μm.

The first sheathing material 130 and the second sheathing material 140 may be in tight contact with each other at the extension 150 such that the fusion layer 131 and the sealing layer 141 contact each other.

Figure 9:
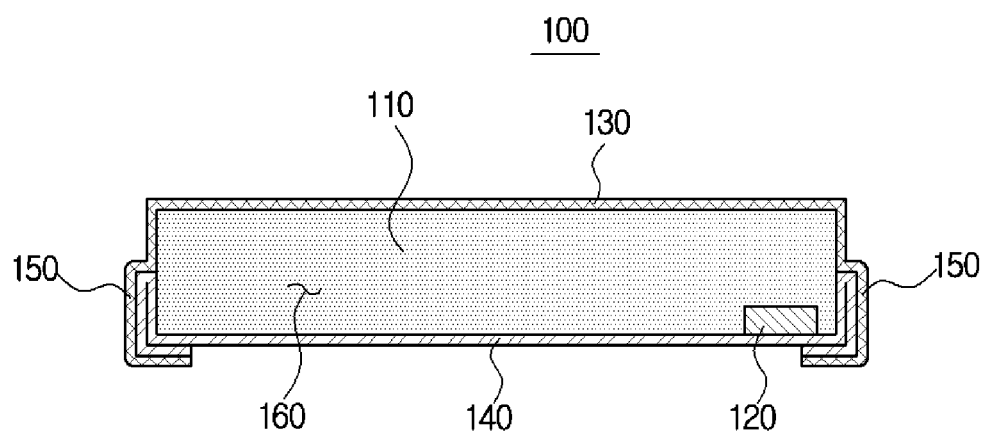
FIG. 9 is a sectional view showing a bent state of the extension of the vacuum insulation panel according to an embodiment of the present invention.

FIG. 9 is a sectional view showing a bent state of the extension of the vacuum insulation panel according to the embodiment of the present invention. For reference numerals which are not shown, see FIGS. 1 to 8.

As shown in FIG. 9, the extension 150 of the vacuum insulation panel 100 may be bent.

The extension 150 may be bent such that the second sheathing material 140 is located between the core material 110 and the first sheathing material 130. That is, the extension 150 may be bent such that the first sheathing material 130 having low thermal conductivity is located outside the second sheathing material 140 having high thermal conductivity. As previously described with reference to FIGS. 1 to 4, the first sheathing material 130 may be disposed between the inner liner 11 and the outer liner 13 so as to be in tight contact with the inner side of the outer liner 13. In addition, the extension 150 is bent such that the second sheathing material 140 having high thermal conductivity is far from the outer liner 13, thereby improving heat insulation performance of the vacuum insulation panel 100.

Figure 10:
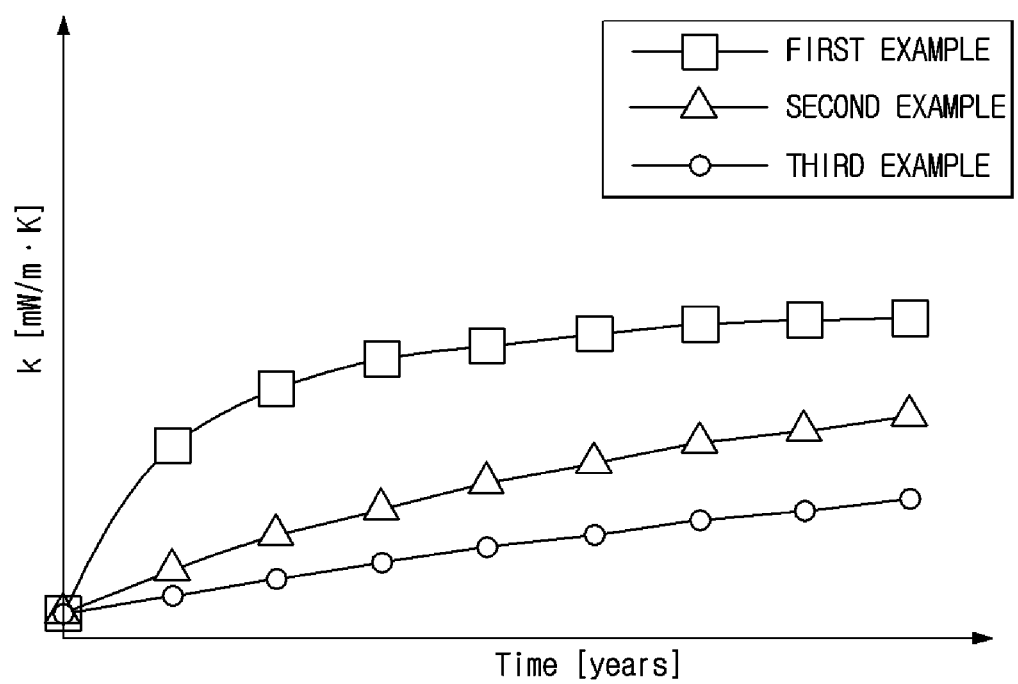
FIG. 10 is a graph showing thermal conductivities in a case in which no getter is used (first example), in a case in which a chemical moisture getter is used (second example), and in a case in which a chemical moisture getter and a gas getter are used (third example)

FIG. 10 is a graph showing thermal conductivities in a case in which no getter is used (first example), in a case in which a chemical moisture getter is used (second example), and in a case in which a chemical moisture getter and a gas getter are used (third example).

As shown in FIG. 10, in a case in which no getter is used (first example), initial thermal conductivity and even long-term thermal conductivity are higher than in cases in which a getter(s) is used (second and third examples), whereby heat insulation performance is lowered. In each case, a glass fiber core material is used. In a case in which both a chemical moisture getter and a gas getter are used to adsorb both moisture and gas (third example), thermal conductivity is lower than in either the case in which no getter is used (first example) and the case in which only a moisture getter is used (second example).

Figure 11:
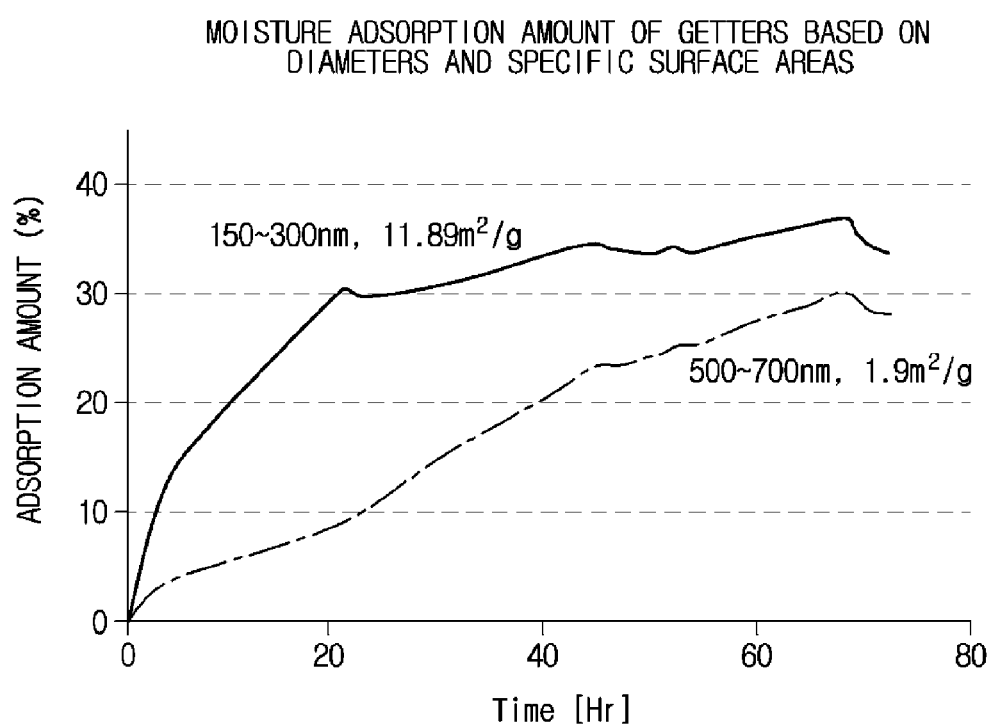
FIG. 11 is a graph showing moisture adsorption amounts of getters having different diameters and specific surface areas.
Figure 12:
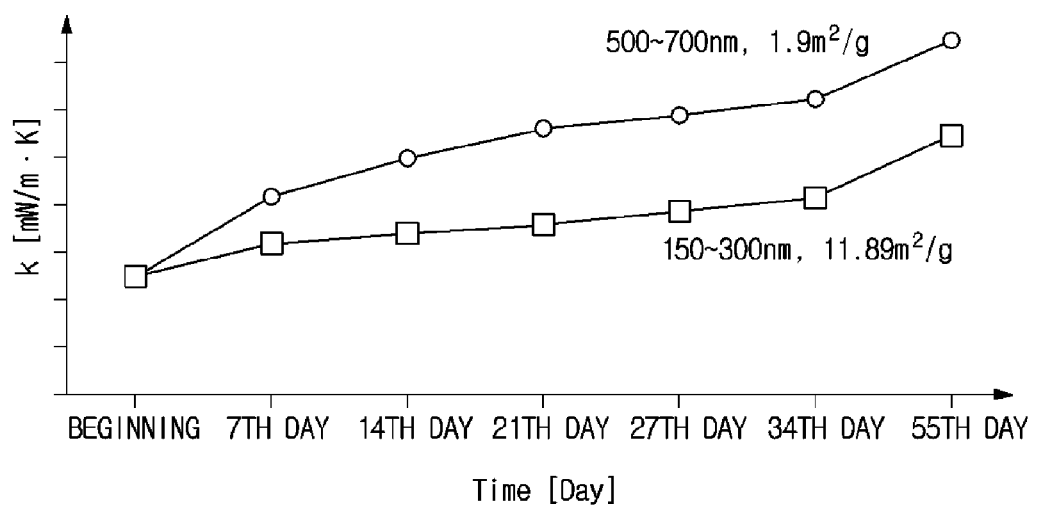
FIG. 12 is a graph showing thermal conductivities of vacuum insulation panels using the getters having different diameters and specific surface areas shown in FIG. 11.

FIG. 11 is a graph showing moisture adsorption amounts of getters having different diameters and specific surface areas and FIG. 12 is a graph showing thermal conductivities of vacuum insulation panels using getters having different diameters and specific surface areas shown in FIG. 11.

The graph of FIG. 11 suggests that a getter having a smaller diameter and a larger specific surface area absorbs a larger amount of moisture than a getter having a larger diameter and a smaller specific surface area.

The graph of FIG. 11 suggests that a vacuum insulation panel using a getter having a smaller diameter and a larger specific surface area has lower thermal conductivity than a vacuum insulation panel using a getter having a larger diameter and a smaller specific surface area. That is, as shown in FIGS. 11 and 12, the specific surface area of the getter is inversely proportional to the thermal conductivity of the vacuum insulation panel. A vacuum insulation panel using a larger specific surface area getter exhibits lower thermal conductivity and thus excellent heat insulation performance.

Figure 13:
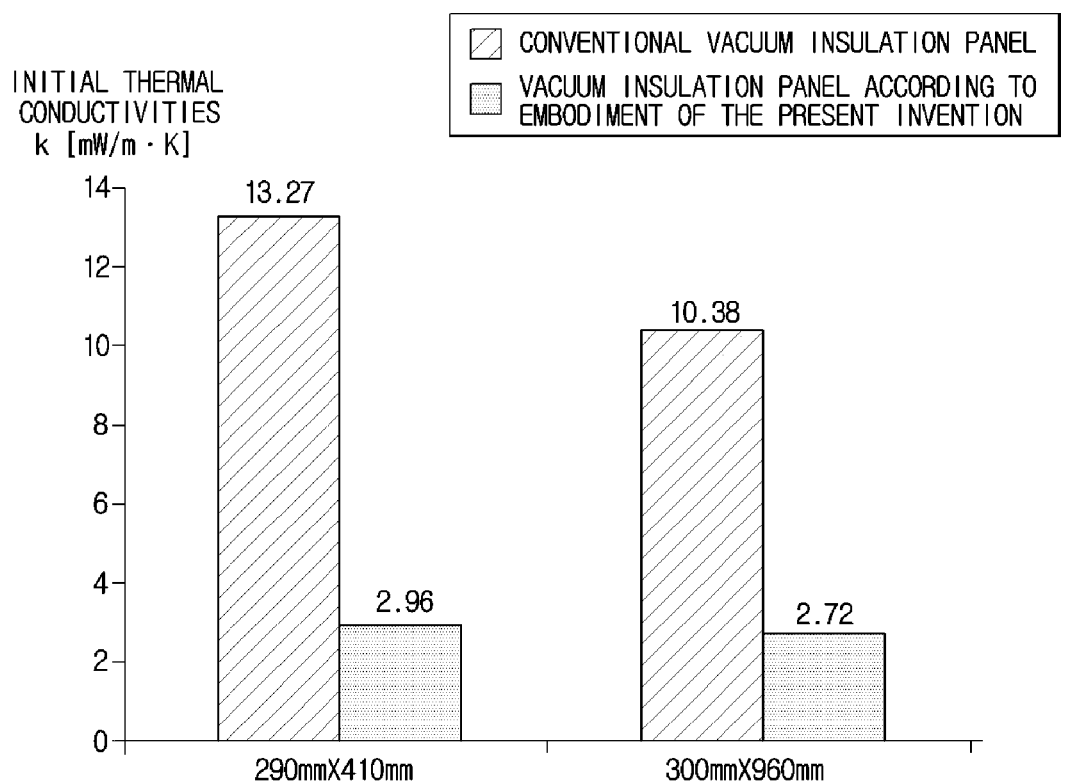
FIG. 13 is a graph showing initial thermal conductivities of the vacuum insulation panel according to the embodiment of the present invention and a conventional vacuum insulation panel.

FIG. 13 is a graph showing initial thermal conductivities of the vacuum insulation panel according to an embodiment of the present invention and a conventional vacuum insulation panel (a vacuum insulation panel using only an aluminum foil sheathing material).

As shown in FIG. 13, the initial thermal conductivity of the vacuum insulation panel according to an embodiment of the present invention is 77.7% lower than that of the conventional vacuum insulation panel when the size of the vacuum insulation panel is 290 mm×410 mm and is 73.8% lower than that of the conventional vacuum insulation panel when the size of the vacuum insulation panel is 300 mm×960 mm.

The vacuum insulation panel 100 according to the present invention may be used for various products requiring heat insulation in addition to the refrigerator.

As is apparent from the above description, a vacuum insulation panel according to the present invention uses a hybrid sheathing material formed by a first sheathing material and a second sheathing material having different thermal conductivities when being coupled such that a glass fiber core material is received in the hybrid sheathing material, thereby reducing moisture and gas permeability and, at the same time, preventing the occurrence of a heat bridge phenomenon.

A thin vacuum insulation panel having high heat insulation performance is used between an outer liner and an inner liner of a refrigerator, thereby embodying a slim refrigerator and, at the same time, increasing storage capacity of the refrigerator.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A vacuum insulation panel comprising:
a core material;
a first sheathing material disposed outside the core material; and
a second sheathing material having different thermal conductivity from the first sheathing material, the second sheathing material being coupled to the first sheathing material to form a receiving space to receive the core material,
wherein the first sheathing material includes a fusion layer and a plurality of blocking layers stacked outside the fusion layer,
wherein each of the plurality of the blocking layers includes a base layer and a deposition layer provided on the base layer to block gas and moisture introduced into the core material,
a first blocking layer, of the plurality of blocking layers, facing the fusion layer includes a first base layer to surround the fusion layer and a first deposition layer located outside the first base layer, and
a second blocking layer, of the plurality of blocking layers, facing the first blocking layer includes a second deposition layer contacting the first deposition layer and a second base layer located outside the second deposition layer.

2. The vacuum insulation panel according to claim 1, wherein the first sheathing material and the second sheathing material are coupled to form an extension extending outward from the receiving space.

3. The vacuum insulation panel according to claim 2, wherein
the first sheathing material has lower thermal conductivity than the second sheathing material, and
the extension is bent such that the second sheathing material is located between the core material and the first sheathing material.

4. The vacuum insulation panel according to claim 1, wherein
each of the first and second deposition layers includes aluminum, and
the second sheathing material comprises aluminum foil.

5. The vacuum insulation panel according to claim 1, wherein
the core material comprises glass fibers, and
each of the glass fibers has a diameter of 3 to 6 um and a length of 20 to 70 nm.

6. The vacuum insulation panel according to claim 5, wherein pores of about 30-80 um are formed between the glass fibers.

7. The vacuum insulation panel according to claim 1, further comprising:
a getter provided in the core material to adsorb at least one selected from between gas and moisture introduced into the core material, wherein
the getter includes at least one selected from between a gas getter and a moisture getter.

8. The vacuum insulation panel according to claim 7, wherein the gas getter comprises at least one selected from among Ba, Li, AI, Ti, V, Fe, Co, Zr, Pd, Mg, and Nb.

9. The vacuum insulation panel according to claim 7, wherein 3 to 10 g of the moisture getter is contained per unit area ($0.1 \text{ m}^3$) of the first sheathing material.

10. The vacuum insulation panel according to claim 9, wherein
the moisture getter includes at least one selected from a chemical getter and a physical getter,
the chemical getter includes at least one selected from among $CaO$, $BaO$, $MgO$, and $CaCl_2$, and
the physical getter includes at least one selected from among molecular sieve, active carbon, zeolite, active alumina, and $MgCO_3$.

11. The vacuum insulation panel according to claim 10, wherein
the chemical getter has a specific surface area of $10 \text{ m}^2/\text{g}$ or more, and
the physical getter has a specific surface area of $50 \text{ m}^2/\text{g}$ or more.

12. The vacuum insulation panel according to claim 7, wherein
the getter includes a catalyst to improve activity of the getter, and
the catalyst includes at least one selected from among $CeO_2$, $CuO$, $Co_3O_4$, $PdO$, and $SeO_2$.

13. The vacuum insulation panel according to claim 1, wherein
the plurality of blocking layers further includes a third blocking layer,
wherein the third blocking layer includes:
a third deposition layer disposed outside the second base layer; and
a third base layer disposed outside the third deposition layer.

14. The vacuum insulation panel according to claim 1, wherein at least one of the deposition layers has a thickness of 10 to 100nm.

15. The vacuum insulation panel according to claim 1, wherein the second sheathing material comprises:
a sealing layer to surround the core material;
an inner layer provided outside the sealing layer;
a prevention layer located between the sealing layer and the inner layer; and
a protection layer disposed outside the inner layer to absorb external impact.

16. A refrigerator comprising:
an outer liner forming an external appearance of the refrigerator;
an inner liner provided in the outer liner to form a storage compartment; and
a vacuum insulation panel located between the outer liner and the inner liner, wherein the vacuum insulation panel includes:
a core material including glass fibers;

a getter provided in the core material to adsorb at least one selected from between gas and moisture introduced into the core material;

a first sheathing material disposed outside the core material so as to face an inner surface of the outer liner; and a second sheathing material having higher thermal conductivity than the first sheathing material, the second sheathing material being coupled to the first sheathing material so as to face an outer surface of the inner liner to form a receiving space to receive the core material, wherein the first sheathing material includes a fusion layer and a plurality of blocking layers stacked outside the fusion layer, wherein each of the plurality of blocking layers includes a base layer and a deposition layer provided on the base layer to block gas and moisture introduced into the core material, a first blocking layer, of the plurality of blocking layers, facing the fusion layer includes a first base layer to surround the fusion layer and a first deposition layer located outside the first base layer, and a second blocking layer, of the plurality of blocking layers, facing the first blocking layer includes a second deposition layer contacting the first deposition layer and a second base layer located outside the second deposition layer.

17. The refrigerator according to claim 16, wherein the first sheathing material and the second sheathing material are coupled to form an extension extending outward from the receiving space, and the extension is bent toward the inner liner such that the second sheathing material is located between the core material and the first sheathing material.

18. The refrigerator according to claim 16, wherein each of the glass fibers has a diameter of 3 to 6 um and a length of 20 to 70 nm.

19. The refrigerator according to claim 16, wherein the getter includes a gas getter and a moisture getter, the gas getter includes at least one selected from among Ba, Li, Al, Ti, V, Fe, Co, Zr, Pd, Mg, and Nb, and the moisture getter includes a chemical getter including at least one selected from among CaO, BaO, MgO, and $CaCl_2$, and a physical getter including at least one selected from among molecular sieve, active carbon, zeolite, active alumina, and $MgCO_3$.

20. The refrigerator according to claim 16, wherein the getter includes a catalyst to improve activity of the getter, and the catalyst includes at least one selected from among $CeO_2$, CuO, $Co_3O_4$, PdO, and $SeO_2$.

21. The refrigerator according to claim 16, wherein the first and second deposition layers include aluminum.

22. The refrigerator according to claim 21, wherein at least one of the deposition layers has a thickness of 10 to 100nm.

23. The refrigerator according to claim 21, wherein the first and second deposition layers are formed by physical deposition including evaporation, sputtering, and aerosol deposition or chemical deposition including chemical vapor deposition (CVD).

24. The refrigerator according to claim 16, wherein the first sheathing material is coupled to the inner surface of the outer liner.

25. A vacuum insulation panel comprising:

a core material including glass fibers;

a getter provided in the core material to adsorb gas and moisture introduced into the core material such that a vacuum state of the core material is maintained;

an aluminum deposited sheathing material disposed outside the core material; and an aluminum foil sheathing material coupled to the aluminum deposited sheathing material to form a receiving space to receive the core material, wherein the aluminum deposited sheathing material and the aluminum foil sheathing material are coupled to form an extension extending outward from the receiving space, wherein the aluminum deposited sheathing material includes a fusion layer and a plurality of blocking layers stacked outside the fusion layer, wherein each of the plurality of blocking layers includes a base layer and a deposition layer provided on the base layer to block gas and moisture introduced into the core material, a first blocking layer, of the plurality of blocking layers, facing the fusion layer includes a first base layer to surround the fusion layer and a first deposition layer located outside the first base layer, and a second blocking layer, of the plurality of blocking layers, facing the first blocking layer includes a second deposition layer contacting the first deposition layer and a second base layer located outside the second deposition layer.

26. The vacuum insulation panel according to claim 25, wherein, the aluminum deposited sheathing material has a lower thermal conductivity than the aluminum foil sheathing material, and wherein, the extension is bent such that the aluminum deposited sheathing material is located outside the aluminum foil sheathing material.

27. The vacuum insulation panel according to claim 25, wherein the aluminum foil sheathing material comprises:

a sealing layer to surround the core material;

an inner layer provided outside the sealing layer;

a prevention layer located between the sealing layer and the inner layer; and a protection layer disposed outside the inner layer.

28. The vacuum insulation panel according to claim 27, wherein the fusion layer and the sealing layer are in contact with each other at the extension.

29. A vacuum insulation panel comprising:

a core material;

a getter provided in the core material to adsorb gas and moisture introduced into the core material;

a first sheathing material disposed outside the core material; and a second sheathing material having a different layered structure than the first sheathing material, the second sheathing material being coupled to the first sheathing material to form a receiving space to receive the core material, wherein the first sheathing material includes a fusion layer and a plurality of blocking layers stacked outside the fusion layer, wherein each of the plurality of blocking layers includes a base layer and a deposition layer provided on the base layer to block gas and moisture introduced into the core material, a first blocking layer, of the plurality of blocking layers, facing the fusion layer includes a first base layer to surround the fusion layer and a first deposition layer located outside the first base layer, and a second blocking layer, of the plurality of blocking layers, facing the first blocking layer includes a second deposition layer contacting the first deposition layer and a second base layer located outside the second deposition layer.

30. The vacuum insulation panel according to claim 1, wherein the first sheathing material is made from a material that is different than the second sheathing material.

31. The vacuum insulation panel according to claim 1, wherein a thickness of the first sheathing material is different than a thickness of the second sheathing material.

* * * * *